United States Patent
Prasad et al.

(10) Patent No.: US 9,538,415 B2
(45) Date of Patent: Jan. 3, 2017

(54) ENHANCED INTERFERENCE MANAGEMENT IN HETEROGENEOUS WIRELESS NETWORKS

(71) Applicant: NEC Laboratories America, Inc., Princeton, NJ (US)

(72) Inventors: Narayan Prasad, Wyncote, PA (US); Mustafa Arslan, Princeton, NJ (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 59 days.

(21) Appl. No.: 14/603,723

(22) Filed: Jan. 23, 2015

(65) Prior Publication Data

US 2015/0208256 A1 Jul. 23, 2015

Related U.S. Application Data

(60) Provisional application No. 61/930,735, filed on Jan. 23, 2014.

(51) Int. Cl.
| | |
|---|---|
| *H04W 28/02* | (2009.01) |
| *H04L 5/00* | (2006.01) |
| *H04W 72/12* | (2009.01) |
| *H04W 24/02* | (2009.01) |

(52) U.S. Cl.
CPC ........ *H04W 28/0236* (2013.01); *H04L 5/0037* (2013.01); *H04L 5/0058* (2013.01); *H04L 5/0073* (2013.01); *H04L 5/0076* (2013.01); *H04W 72/1273* (2013.01); *H04W 24/02* (2013.01)

(58) Field of Classification Search
CPC .......... H04L 47/10; H04L 47/35; H04L 47/30; H04L 47/32
See application file for complete search history.

(56) References Cited

U.S. PATENT DOCUMENTS

| | | | |
|---|---|---|---|
| 2008/0075033 A1* | 3/2008 | Shattil | H04B 7/026 370/328 |
| 2012/0281556 A1* | 11/2012 | Sayana | H04B 7/024 370/252 |
| 2013/0196678 A1* | 8/2013 | Liu | H04W 28/16 455/452.1 |
| 2013/0208604 A1* | 8/2013 | Lee | H04L 25/0226 370/252 |
| 2015/0065108 A1* | 3/2015 | Bedekar | H04W 24/02 455/418 |

(Continued)

*Primary Examiner* — Hassan Phillips
*Assistant Examiner* — Prenell Jones
(74) *Attorney, Agent, or Firm* — Joseph Kolodka

(57) ABSTRACT

We show that for any given muting fraction, a more constrained version of the problem of interest can be optimally solved in an efficient manner. In addition, the obtained solution is also a near-optimal solution for the original problem (for the given muting ratio). This allows us provide an algorithm that offers a good solution to the original problem with a tractable complexity. We also derive a lower complexity greedy that offers good performance and a certain worst-case performance guarantee. Simulations over an example LTE HetNet topology reveal the superior performance of the proposed algorithms and underscore the benefits of jointly exploiting partial muting of the macro and load balancing.

16 Claims, 4 Drawing Sheets

(56) References Cited

U.S. PATENT DOCUMENTS

| | | | |
|---|---|---|---|
| 2015/0189574 A1* | 7/2015 | Ng | H04W 24/08 370/252 |
| 2016/0037535 A1* | 2/2016 | Prasad | H04L 1/00 370/230 |

* cited by examiner

ENHANCED INTERFERENCE MANAGEMENT IN HETEROGENEOUS WIRELESS NETWORKS

RELATED APPLICATION INFORMATION

This application claims priority to provisional application No. 61/930,735 filed Jan. 23, 2014, entitled "Enhanced Interference Management in Heterogeneous Wireless Networks", the contents thereof are incorporated herein by reference

BACKGROUND OF THE INVENTION

The present invention relates generally to wireless networks, and more particularly, to enhanced interference management in heterogeneous wireless networks.

The focus of this invention is on heterogeneous wireless networks (HetNets) that are expected to be fairly common and where the transmission points in the HetNet will be connected to each other by a non-ideal backhaul with a relatively high latency (ranging from 50 milliseconds to several dozens of milliseconds).

Over such HetNets, schemes that strive to obtain all coordinated resource management decisions within the fine slot-level granularity (typically a millisecond) are not suitable, since coordination (which involves exchange of messages and signaling over the backhaul) cannot be performed in such a fast manner. Instead, semi-static resource management schemes, where resource management over the set of transmission points TPs is performed at two time scales, are suitable since they are more robust towards backhaul latency.

The present invention considers one such semi-static resource management scheme. It focuses on a cluster of TPs that includes one high power macro TP and several low power pico TPs. The macro TP is the dominant interferer for all other pico TPs. The management scheme attempts to jointly exploit partial muting of the macro TP, wherein the macro TP can be made inactive for a fraction of the frame duration, and load balancing (a.k.a. user association), wherein users are associated to the TPs in that cluster, such that each user is associated to any one TP over the frame duration. The fraction for which the macro is muted can be chosen from a given finite set of fractions. This scheme requires limited coordination among TPs in the cluster which is possible under a non-ideal backhaul. The underlying coordination is performed periodically at a coarser frame-level granularity based on averaged (not instantaneous) slowly varying metrics that are relevant for a period longer than the backhaul latency. Examples of such metrics include estimates of average rates that the users can receive from those TPs under different configurations etc. On the other hand, the resource management that is done at a much finer sub-frame/slot level granularity involves no coordination among TPs and is done independently by each active TP based on fast changing information, such as instantaneous rate or SINR estimates, that is received directly by that TP from the users associated to it.

Together, partial muting of the macro transmission point TP and load balancing can lead to significant benefits.

The HetNet diagram of FIG. 1 shows 3 TPs and 3 users and associated frames. TP1 is the high power macro TP and TP2 and TP3 are the low power pico TPs. Dashed lines indicate potential association of users to TPs. TP1 is made inactive (is muted) for a fraction of the frame duration, whereas TP2 and TP3 are active throughout the frame.

Most existing works consider either exploiting only partial muting of the macro TP for a given user association or exploiting only user association for a given partial muting. Also, the prior art has adopted an approach which relaxes the underlying discrete variables, which can degrade performance.

Accordingly, there is a need for enhanced interference management in heterogeneous wireless networks.

BRIEF SUMMARY OF THE INVENTION

The invention is directed to a computer implemented method including varying association of users to any one of multiple transmission points in a heterogeneous wireless network for managing interference of transmissions in the network, a muting fraction being one transmission point TP being inactivated or muted for a fraction of a frame duration while other transmission points TPs being active throughout the frame duration, determining, at a coarse time-scale, at the start of each frame a choice of which muting fraction to select for a macro TP and which users to associate with each TP so that all users are associated to one TP, by solving an optimization problem, averaging inputs to the optimization problem varying metrics that are relevant for a period longer than a backhaul latency, the varying metrics including metrics as single user rates under muting conditions and non-muting conditions with a set of muting fractions, applying a coarse time scale approach to solving the optimization problem, the coarse scale approach being based on frame level TP coordination of user association and macro partial muting; and applying a fine time scale approach to solving the optimization problem, the fine time scale approach being based on sub-frame level per-TP user scheduling without coordination.

In a similar aspect of the invention, there is provided a non-transitory storage medium configured with instructions for being implemented by a computer for carrying out the method of varying association of users to any one of multiple transmission points in a heterogeneous wireless network for managing interference of transmissions in the network, a muting fraction being one transmission point TP being inactivated or muted for a fraction of a frame duration while other transmission points TPs being active throughout the frame duration, determining, at a coarse time-scale, at the start of each frame a choice of which muting fraction to select for a macro TP and which users to associate with each TP so that all users are associated to one TP, by solving an optimization problem, averaging inputs to the optimization problem varying metrics that are relevant for a period longer than a backhaul latency, the varying metrics including metrics as single user rates under muting conditions and non-muting conditions with a set of muting fractions, applying a coarse time scale approach to solving the optimization problem, the coarse scale approach being based on frame level TP coordination of user association and macro partial muting, and applying a fine time scale approach to solving the optimization problem, the fine time scale approach being based on sub-frame level per-TP user scheduling without coordination.

These and other advantages of the invention will be apparent to those of ordinary skill in the art by reference to the following detailed description and the accompanying drawings.

DETAILED DESCRIPTION

The present invention is based on, that for any given muting fraction, a more constrained version of the problem of interest can be optimally solved in an efficient manner. In addition, the obtained solution is also a near-optimal solution for the original problem (for the given muting ratio). This allows providing a procedure that offers a good solution to the original problem with a tractable complexity. The inventive solution also includes a lower complexity greedy procedure that offers good performance and a certain worst-case performance guarantee. Simulations over an example LTE HetNet topology reveal the superior performance of the proposed solution and underscore the benefits of jointly exploiting partial muting of the macro and load balancing.

Figure 1:
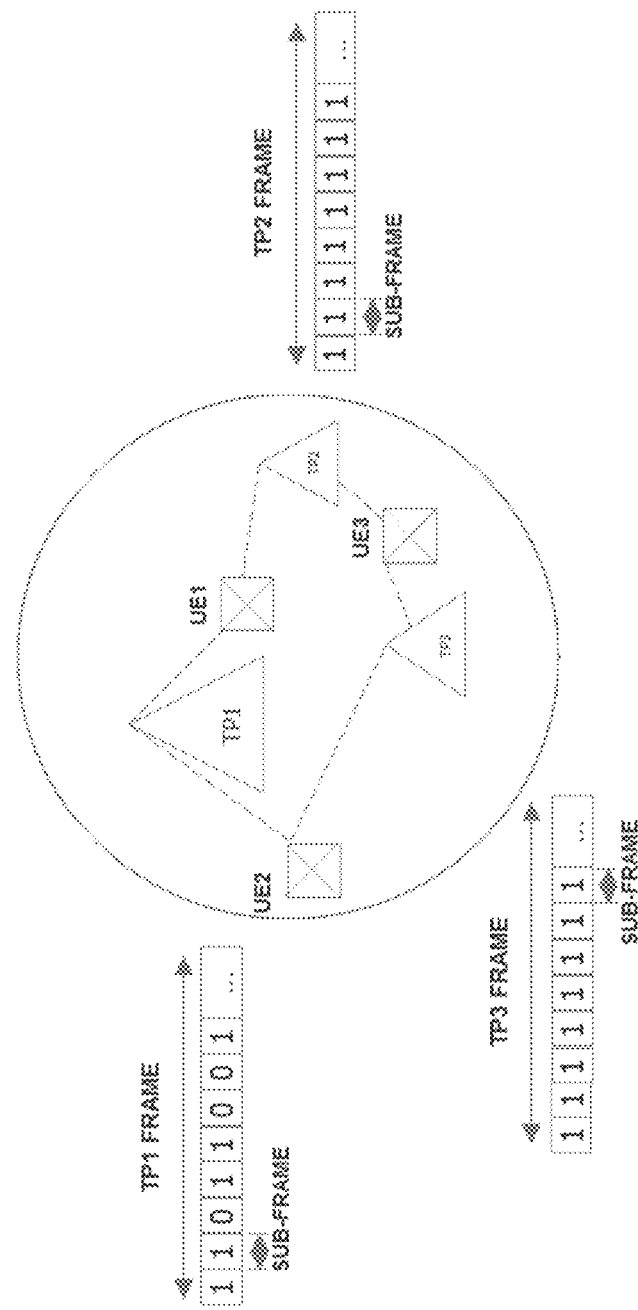
FIG. 1 is a diagram of a heterogeneous network (HetNet), in accordance with the invention.
Figure 2:
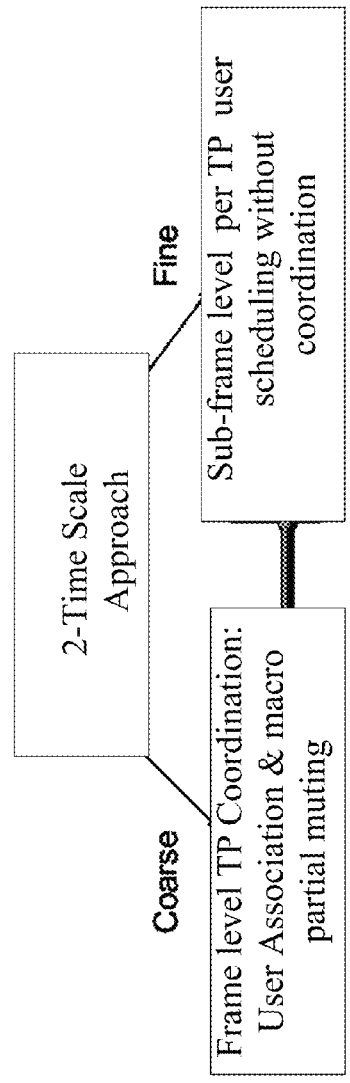
FIG. 2 is a flow diagram of the two-time scale approach, in accordance with the invention.

FIG. 2 is a diagram of the two-time scale approach of the present invention. At a coarse time-scale, at the start of each frame the choice of which muting fraction to select for the macro TP and which users to associate with each TP (so that all users are associated to one TP each) are determined by solving an optimization problem.

The inputs to the optimization problem are averaged (not instantaneous) slowly varying metrics that are relevant for a period longer than the backhaul latency. At a the fine time-scale, in each slot each active TP independently does scheduling over the set of users associated with it, without any coordination with any of the other active TPs, based on fast changing information, such as instantaneous rate or SINR estimates, that is received directly by that TP from the users associated to it.

We introduce the optimization problem of interest:

$$\max_{z \in Z} \max_{x_{u,b} \in [0,1], \gamma_{u,b}, \theta_{u,b} \in [0,1] \forall u,b} \left\{ \sum_{u \in U} \sum_{b \in B} x_{u,b} \ln(R_{u,b}^{nm}(1-z)\theta_{u,b} + R_{u,b}^{m} z \gamma_{u,b}) \right\}$$

$$\text{s.t.} \sum_{b \in B} x_{u,b} = 1, \forall u \in U,$$

$$\sum_{u \in U} \gamma_{u,b} \le 1 \ \& \ \sum_{u \in U} \theta_{u,b} \le 1 \forall b \in B,$$

In this optimization problem, the inputs are the set of muting fractions Z; the average single-user rate of each user u when associated to the macro TP; as well as the average single-user rates of each user u when associated to each pico TP b, under muting as well as non-muting of the macro TP ($R_{u,b}^{m}$, $R_{u,b}^{nm}$) respectively.

The variables are the indicator variable for association of user u to TP b: $x_{u,b}$ and the non-negative allocation fractions $\gamma_{u,b}, \theta_{u,b}$.

The constraints are: associate each user with one TP; and the sum of the respective allocation fractions over all users should not exceed unity for each TP.

Note that in this joint problem we are trying to jointly determine what is the best fraction (from the given set of fractions) of the frame duration for which the macro TP should be muted, and what should be the TP each user should be associated to (user association).

This requires us to first solve a simpler problem of optimizing allocation fractions for a given feasible muting fraction and user association. In particular, in this simpler problem for any TP, given the muting fraction of the macro and the set of users associated to that TP, we have to decide how much of the portion of the frame over which the macro TP is muted should be assigned to each associated user and how much of the portion of the frame over which the macro TP is not muted should be assigned to each associated user.

We completely solve this simpler problem and obtain optimal allocation fractions for the simpler problem in closed form. In the optimal solution of this simpler problem, each TP assigns resources to at-most one of its associated users during both muting and non-muting of the macro. The remaining users are assigned resources either during muting or during non-muting.

The insight from this result leads us to the fact that the optimal solution to a "more constrained" problem, in which for each muting fraction, each user is only allowed to be served either during muting or during non-muting and not both, is also near-optimal for the original joint problem.

For any given muting fraction, this "more constrained problem" is given by:

$$\max_{x_u^m, x_u^{nm} \in [0,1] \forall u} \left\{ \sum_{u \in A} (x_u^{nm} \ln(R_u^{nm}(1-z)) + x_u^m \ln(R_u^m z)) - \left( \left( \sum_{k \in A} x_k^{nm} \right) \ln \left( \sum_{k \in A} x_k^{nm} \right) + \left( \sum_{k \in A} x_k^m \right) \ln \left( \sum_{k \in A} x_k^m \right) \right) \right\}$$

$$\text{s.t.} (x_u^{nm} + x_u^m) = 1, \forall u \in A,$$

The indicator variables $x_{u,b}^m, x_{u,b}^{nm}$ are 1 when user u is associated to TP b during the portion of the frame where the macro TP is muted and not muted, respectively.

This more constrained problem is a load balancing problem, which using a previous result developed by us, can be shown to be equivalent to an assignment problem, and hence optimally solvable in an efficient manner.

Then, after optimally solving the "more constrained" problem we obtain user association (i.e., the TP that each user is associated to). For each TP, we collect the set of users associated to it and then obtain the optimal allocation fractions (using the result derived earlier for the simpler problem). Doing so allows us to determine a good solution for the original joint problem under the given muting fraction. By comparing the solutions across all feasible muting fractions in terms of the system utility they respectively yield (recall that the set of all feasible muting fractions is finite), we select the best muting fraction together with its corresponding user association. The resulting procedure, referred to as the assignment based procedure, is detailed below in the discussion of FIG. 3.

Figure 3:
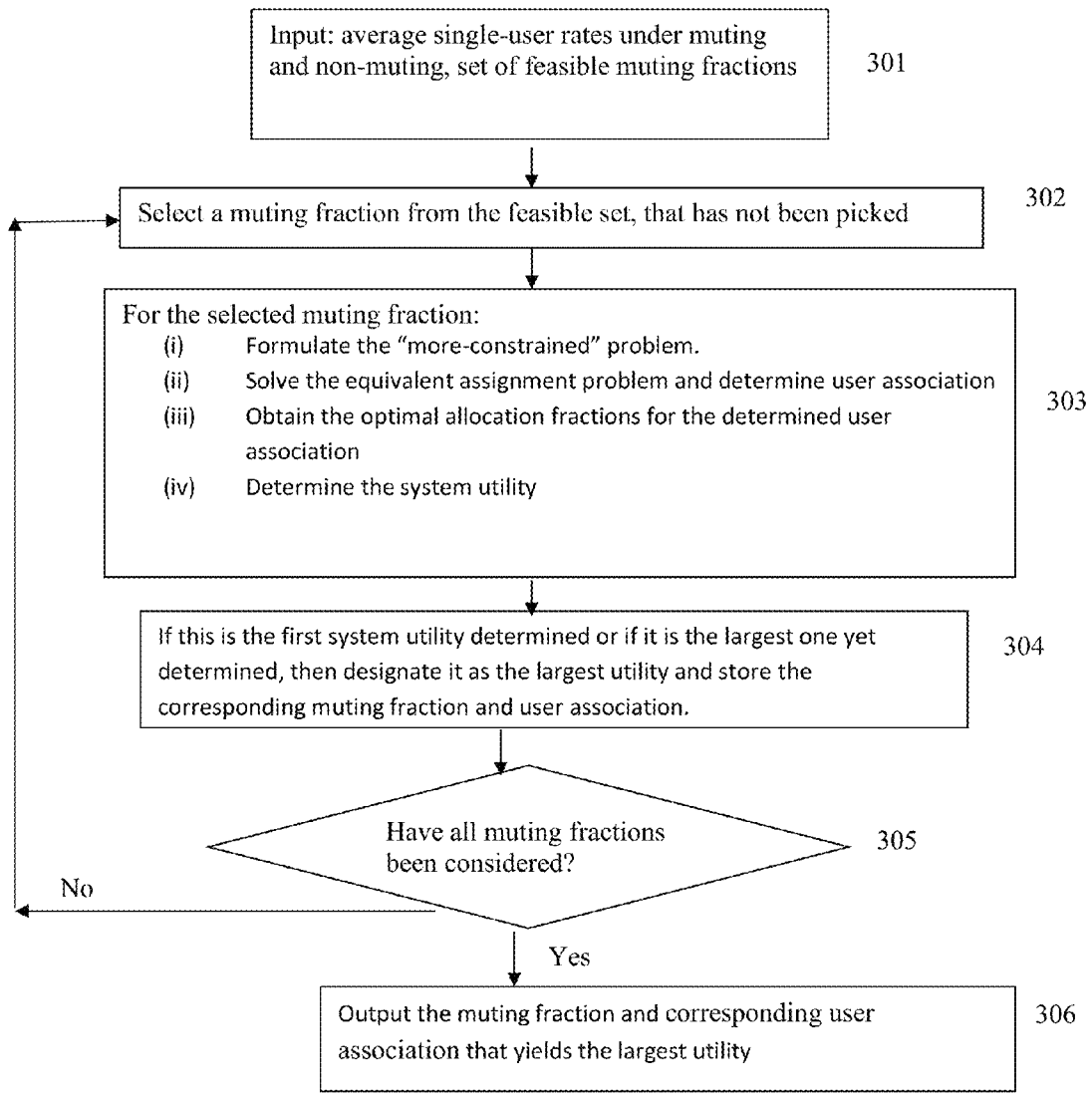
FIG. 3 is a flow diagram of the assignment-based procedure, in accordance with the invention.
Figure 4:
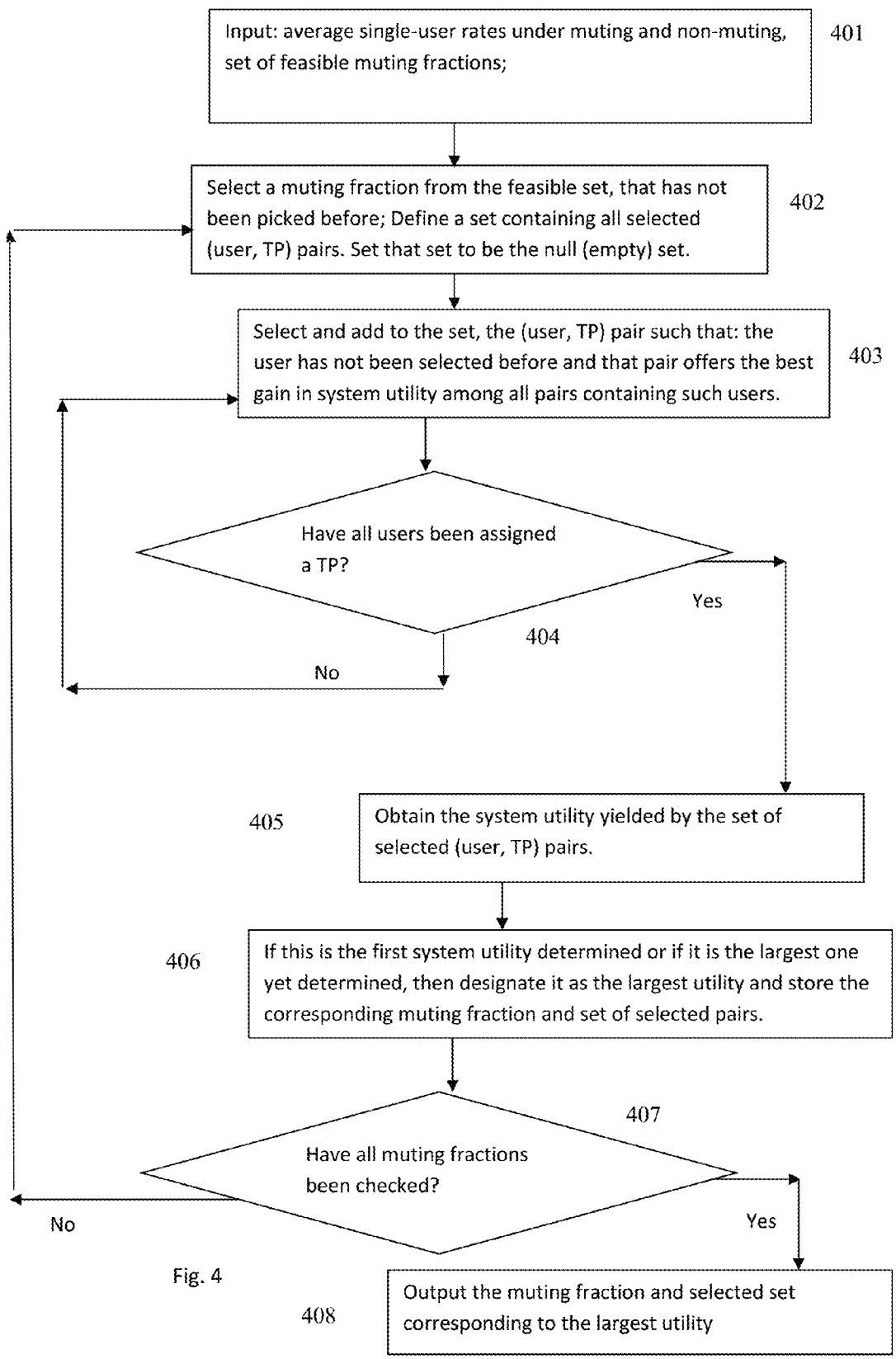
FIG. 4 is a flow diagram of a greedy procedure, in accordance with the invention.

Turning now to FIG. 3, a diagram of the assignment, initially there is an input of average single-user rates under muting and non-muting, set of feasible muting fractions 301. Then there is a selecting of a muting fraction from the feasible set, that has not been picked before 302.

For the selected muted fraction 303:

(i) Formulate the "more-constrained" problem.

(ii) Solve the equivalent assignment problem and determine user association (iii) Obtain the optimal allocation fractions for the determined user association (iv) Determine the system utility If this is the first system utility determined or if it is the largest one yet determined, then designate it as the largest utility and store the corresponding muting fraction and user association 304.

There is a check if all muting fractions have been considered 305. If not, the procedure loops back to step 302. If so, the procedure outputs the muting fraction and corresponding user association that yields the largest utility 306.

Next, is a lower complexity sequence in which the user association for each muting fraction is determined in a greedy fashion. To speed up the step of determining the best (user, TP) pair we re-consider the simpler problem and derive the change in utility upon associating a new user to any TP.

Turning now to FIG. 2, there is shown a diagram of the greedy procedure. Initially there is an input of average single-user rates under muting and non-muting, set of feasible muting fractions 401.

The procedure, 402, selects a muting fraction from the feasible set, that has not been picked before; Define a set containing all selected (user, TP) pairs. Set that set to be the null (empty) set.

Then the procedure, 403, selects and adds to the set, the (user, TP) pair such that: the user has not been selected before and that pair offers the best gain in system utility among all pairs containing such users.

There is a check if all users have been assigned a transmission point TP 404. If not, the procedure loops back to 403. If so the system utility yielded by the set of selected (user, TP) pairs is obtained 405.

Then, if this is the first system utility determined or if it is the largest one yet determined, then designate it as the largest utility and store the corresponding muting fraction and set of selected pairs 406.

Then there is a check if all muting fractions have been checked 407. If not, the procedure loops back to 402. If so, then there is an output of the muting fraction and selected set corresponding to the largest utility.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 5:
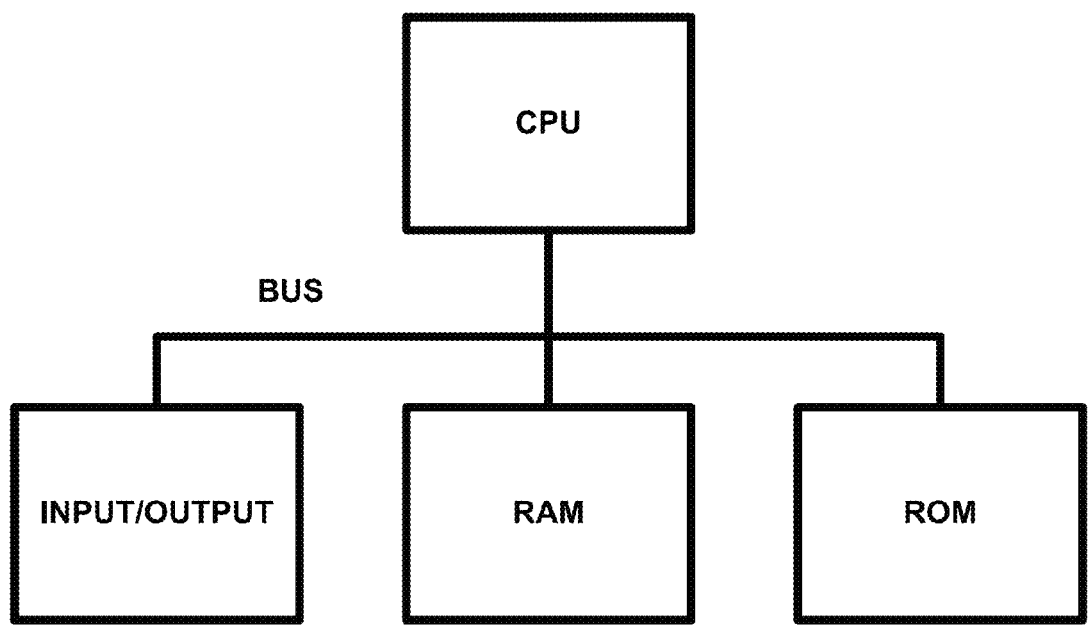
FIG. 5 is a diagram of an exemplary computer for carrying out the invention.

By way of example, a block diagram of a computer to support the invention is discussed next in FIG. 5. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Additional Information

The transformation of traditional cellular wireless networks defined by a structured layout of cells with each cell being served by a high power macro base-station, into dense HetNets is underway. These HetNets are formed by a multitude of transmission points (or nodes) ranging from enhanced versions of the conventional high power macro base-station to low power pico nodes, deployed in a highly irregular fashion [3]. For tractable resource allocation, a HetNet is partitioned into several coordination units with each unit comprising of a set of transmission points (TPs) that include a high power macro node along with several low power pico nodes, as well as a set of users that those TPs should serve. In most deployments the TPs in each unit are expected to be connected to each other by a non-ideal backhaul with a relatively high latency and oftentimes a limited capacity. As a result, only semi-static coordination among TPs in the unit is viable in practice, wherein each TP independently performs resource allocation at a fine time granularity (typically a millisecond) to serve the users associated to it, but periodically (once in several hundred milliseconds) the set of users associated to each TP is altered (a.k.a. load balancing). This load balancing requires limited coordination among TPs in a unit which is possible under a non-ideal backhaul, and it mitigates the undesirable scenarios of TPs becoming overloaded due to too many users being associated with them and users being interference limited due to transmissions from too many interfering TPs [3]. Since the main source of interference for a user being served by a low power pico node is the high power macro node, a useful feature that has been added to the fourth generation LTE cellular standard is that of partially muting the macro node [1]. Under this feature the macro node can be muted (made inactive) for a specified fraction of the available resource, where this fraction itself can be chosen from a limited finite set.

Simulations during the standardization process have revealed that this partial muting feature can result in useful gains. On the other hand, the study of load balancing over HetNets has received significant recent attention, cf. [3] and the references therein. Indeed, as argued in [3] the previous approaches to load balancing (such as the maximum received signal strength based association) which worked well over conventional cellular networks can be grossly inadequate and new approaches for load balancing are needed [2]. Recent investigations in [4, 5] reveal that the gains offered by partial muting can be significantly improved when it is used in conjunction with load balancing. Both [4, 5] adopt an approach in which the optimal method to jointly exploit these two techniques can be obtained by solving a purely continuous optimization problem. Algorithms to efficiently solve the underlying continuous optimization problem along with several related insights are then obtained. However, that approach itself is made possible by two assumptions: the first one being that any muting fraction in the unit interval can be selected and the second one being that fractional user association (i.e., allowing a user to be associated to multiple TPs instead of one) is permitted. We note that neither assumption is permitted as per the current standard specification and the solutions obtained from either [4] or [5] must thus be rounded to ensure feasibility. Our key contributions in this work are to formulate the problem to determine the jointly optimal partial muting fraction and load balancing without the aforementioned assumptions and to systematically derive an efficient algorithm whose solution is approximately optimal.

Problem Formulation

Let U denote the set of users with cardinality $|U|=K$ and let $=\{1, \ldots, B\}$ denote the set of TPs. Further, suppose that the TP with index $1 \in B$ is the macro TP and the remaining ones are all pico TPs. For each user $u \in U$ and each TP $b \in B$, we define $R_{u,b}^m$ to be the average rate user u can get (per unit resource) when it alone is served by TP b and when the macro TP is muted. Similarly, we define $R_{u,b}^{nm}$ to be the average rate user u can get when it alone is served by TP b and when the macro TP is not muted. These rates are averaged over fast fading but depend on the slow fading (e.g. path loss and shadowing) realization, and include the interference from all pico TPs other than b. Clearly, $R_{u,b}^{nm} \leq R_{u,b}^m$, $\forall u \in U$ & $b \geq 2$, whereas $R_{u,1}^{nm} \geq R_{u,1}^m = 0$, $\forall u$. For convenience in exposition we make the mild assumption that $R_{u,b}^{nm} > 0$, $\forall u,b$. We also assume that $$\frac{R_{u,b}^{nm}}{R_{u,b}^m} \neq \frac{R_{u',b}^{nm}}{R_{u',b}^m},$$

$\forall b$ & $u \neq u'$ and note that these two assumptions hold true almost surely for all typical slow fading distributions. Next, suppose that the finite set Z contains all possible muting fractions such that each $z \in Z$ represents a choice for the fraction of the available unit resource for which the macro TP is muted. The problem of interest to us is the mixed optimization problem given in (1).

$$\max_{z \in Z} \max_{x_{u,b} \in [0,1], \gamma_{u,b}, \theta_{u,b} \in [0,1] \forall u,b} \left\{ \sum_{u \in U} \sum_{b \in B} x_{u,b} \right. \tag{1}$$

$$\ln(R_{u,b}^{nm}(1-z)\theta_{u,b} + R_{u,b}^m z \gamma_{u,b}) \right\}$$

$$\text{s.t.} \sum_{b \in B} x_{u,b} = 1, \forall u \in U,$$

$$\sum_{u \in U} \gamma_{u,b} \leq 1 \ \& \sum_{u \in U} \theta_{u,b} \leq 1 \forall b \in B,$$

Note that in (1) the binary valued variable $x_{u,b}$ is one if user u is associated to TP b and zero otherwise, so that the first set of constraints in (1) ensures that each user is associated with only one TP. Consequently, $\{x_{u,b}\}_{u \in U}$ yields the user set associated with TP b. The continuous variables $\{\gamma_{u,b}, \theta_{u,b}\}$ are referred to here as allocation fractions and their respective sums are upper bounded by unity for each TP, as depicted in the second set of constraints.

A Simplified Setup

We begin our quest to solve (1) by first considering a simpler problem where we focus on any one TP, and where a muting fraction $z \in (0,1)$ is given and users from a set $A \subseteq U$ are already associated to that TP. We first suppose the TP of interest to be a pico node and for notational convenience we omit the subscript identifying that TP in this section. The resulting problem of interest is given by $$\max_{\gamma_u, \theta_u \in [0,1] \forall u \in A, \sum_u \gamma_u \leq 1, \sum_u \theta_u \leq 1} \left\{ \sum_{u \in A} \ln(R_u^{nm}(1-z)\theta_u + R_u^m z \gamma_u) \right\} \tag{2}$$

The optimization problem in (2) is that of maximizing a strictly concave function whose optimal solution can be completely characterized. To do so, we define a vector of effective rates as $R^{eff} = [R_u^{nm}(1-z), R_u^m z]_{u \in A}$. Furthermore, we also define some functions in (3).

$$h(R_A^{eff}, n+1) = \sum_{q=1}^{n+1} \ln(R_{\pi(q)}^{nm}(1-z)) + \sum_{q=n+2}^{|A|} \ln(R_{\pi(q)}^m z) - \tag{3}$$

$$|A|\ln(|A|) + |A|\ln(1 + \alpha_{\pi(n+1)}) - (|A| - n - 1)\ln(\alpha_{\pi(n+1)}),$$

$$g(R_A^{eff}, n+1) = \sum_{q=1}^{n+1} \ln(R_{\pi(q)}^{nm}(1-z)) + \sum_{q=n+2}^{|A|} \ln(R_{\pi(q)}^m z) -$$

$$(n+1)\ln(n+1) - (|A| - n - 1)\ln(|A| - n - 1),$$

$$\forall n = 0, \ldots, |A|-1,$$

$$\alpha_u = \frac{R_u^m z}{R_u^{nm}(1-z)}, \forall u \in A;$$

$$\pi:\{1, \ldots, |A|\} \to \text{ s.t. } \alpha_{\pi(1)} < \alpha_{\pi(2)} \ldots < \alpha_{\pi(|A|)}.$$

Note that in defining the permutation $\pi(.)$ which is determined using the effective rates $R_A^{eff}$ in (3), we have used the fact that $\alpha_u = \alpha_{u'}$ is not possible for any two distinct users $u \neq u'$. Finally, let $\hat{\theta}_u, \hat{\gamma}_u, \forall u$ denote an optimal solution to (2) with $\hat{O}(U)$ denoting the optimal objective value.

Proposition 1 There exists a unique integer $\hat{n} \in \{0, \ldots, |A|-1\}$ such that either $$\alpha_{\pi(\hat{n}+1)} \in \left[ \frac{|A|}{\hat{n}+1} - 1, \frac{|A|}{\hat{n}} - 1 \right]$$

in which case the unique optimal solution to (2) is $(\hat{\theta}_{\pi(k)}, \hat{\gamma}_{\pi(k)})$ $$= \begin{cases} \left( \frac{1 + \alpha_{\pi(\hat{n}+1)}}{|A|}, 0 \right), & \forall k = 1, \ldots, \hat{n}, \\ \left( 1 - \frac{\hat{n}(1 + \alpha_{\pi(\hat{n}+1)})}{|A|}, \right. \\ \left. 1 - \frac{(|A| - \hat{n} - 1)(1 - \alpha_{\pi(\hat{n}+1)})}{|A|\alpha_{\pi(\hat{n}+1)}} \right), & k = \hat{n}+1, \\ \left( 0, \frac{1 + \alpha_{\pi(\hat{n}+1)}}{|A|\alpha_{\pi(\hat{n}+1)}} \right), & \forall k = \hat{n}+2, \ldots, |A|, \end{cases}$$

yielding $\hat{O}(A)=h(R_A^{eff},\hat{n}+1)$, or $$\alpha_{\pi(\hat{n}+1)} < \frac{|A|}{\hat{n}+1} - 1 \ \& \ \alpha_{\pi(\hat{n}+2)} > \frac{|A|}{\hat{n}+1} - 1$$

in which case the unique optimal solution to (2) is $$(\hat{\theta}_{\pi(k)}, \hat{\gamma}_{\pi(k)}) = \begin{cases} \left(\frac{1}{\hat{n}+1}, 0\right), & \forall k = 1, \ldots, \hat{n}+1, \\ \left(0, \frac{1}{|A|-\hat{n}-1}\right) & \forall k = \hat{n}+2, \ldots, |A|, \end{cases} \quad (4)$$

yielding $\hat{O}(A)=g(R_A^{eff},\hat{n}+1)$.

The problem in (2) is a convex optimization problem for which the K.K.T conditions are both necessary and sufficient. These K.K.T conditions include the following:

$$\frac{R_u^{nm}(1-z)}{R_u^{nm}(1-z)\theta_u + R_u^m z \gamma_u} + \eta_u = \lambda \quad (5)$$

$$\frac{R_u^m z}{R_u^{nm}(1-z)\theta_u + R_u^m z \gamma_u} + \vartheta_u = \beta,$$

along with the complementary slackness conditions $\eta_u \theta_u = 0$, $\Theta_u \gamma_u = 0$, $\forall u$ and $(1-\Sigma_u \theta_u)\lambda = 0$, $(1-\Sigma_u \gamma_u)\beta = 0$, and the feasibility ones $\theta_u, \gamma_u \in (0,1)$, $\forall u$, $\Sigma_u \theta_u \leq 1$, $\Sigma_u \gamma_u \leq 1$. Note that $\lambda, \beta$, $\{\eta_u, \Theta_u\}_{u \in}$ are non-negative Lagrangian variables. Manipulating the first two K.K.T conditions in (5) along with the complementary slackness conditions, we see that for any two distinct users u, u'∈

$$\theta_u \gamma_u \neq 0 \ \& \ \theta_{u'} \gamma_{u'} \neq 0 \Rightarrow \alpha_u = \alpha_{u'},$$

which is a contradiction. Consequently, there can be at-most one user u for which $\theta_u \gamma_u \neq 0$.
From the remaining conditions, we can further deduce that $$\theta_u = 0 \Rightarrow \gamma_u = \frac{1}{\beta} \ \& \ \frac{\beta}{\lambda} \leq \alpha_u$$

$$\gamma_u = 0 \Rightarrow \theta_u = \frac{1}{\lambda} \ \& \ \frac{\beta}{\lambda} \geq \alpha_u$$

Then, using the aforementioned observations with further algebraic manipulations we can characterize the optimal solution as claimed in the proposition, where we note that the uniqueness of the optimal solution follows from the strict concavity of the objective in (2). We note that Proposition 1 proved above is closely related to a result stated without proof in [4]. We also note that the observation that at-most one user can be served by a pico node both during muting and non-muting has been proved in [5]. We next introduce another useful result that will be invoked to establish the performance guarantee of an algorithm proposed later in the sequel. Towards that end, for the problem in (2) let us denote any solution in which $\theta_u \gamma_u = 0$ $\forall u \in$ as α solution with an orthogonal split of users. Notice that in Proposition 1, the optimal solution in (4) is a solution with an orthogonal split of users but the optimal solution in the other case is not.

Proposition 2 The optimal among all solutions to (2) having an orthogonal split of users can be determined by solving (6).

$$\max_{x_u^{nm},x_u^m \in [0,1] \forall u} \left\{ \sum_{u \in A} (x_u^{nm} \ln(R_u^{nm}(1-z)) + x_u^m \ln(R_u^m z)) - \left( \left(\sum_{k \in A} x_k^{nm}\right) \ln\left(\sum_{k \in A} x_k^{nm}\right) + \left(\sum_{k \in A} x_k^m\right) \ln\left(\sum_{k \in A} x_k^m\right) \right) \right\} \quad (6)$$

$$\text{s.t.} (x_u^{nm} + x_u^m) = 1, \forall u \in A,$$

Moreover, the optimal solution determined from (6) yields an objective value no less than $\hat{O}(A)-\ln(2)$.

Consider any solution to (2) with an orthogonal split of users and define sets $A^{nm}=\{u \in A: \theta_u > 0\}$ and $A^m=\{u \in :\gamma_u > 0\}$. Note here that without loss of generality we can assume that $A=A^{nm} \cup A^m$ and that $\Sigma_{u \in A^{nm}} \theta_u = 1$ and $\Sigma_{u \in A^m} \gamma_u = 1$. Then, using the arithmetic mean–geometric mean (AM-BM) inequality we can deduce that the objective value yielded by the solution at hand is upper bounded by $\Sigma_{u \in A^{nm}} \ln(R_u^{nm}(1-z)) - |A^{nm}| \ln|A^{nm}| + \Sigma_{u \in A^m} \ln(R_u^m(1-z)) - |A^m| \ln|A^m|$. This proves that the optimal among all solutions with an orthogonal split of users can be determined upon solving (6). Next, letting O'(A) denote the optimal objective value of (6), we note that in the case where the optimal solution of (2) is given by (4), we must have that $\hat{O}(A)=\hat{O}'(A)$. Further, in the remaining case given in Proposition 1, we see that since $$\ln(R_{\pi(\hat{n}+1)}^{nm}(1-z)\theta_{\pi(\hat{n}+1)} + R_{\pi(\hat{n}+1)}^m z \gamma_{\pi(\hat{n}+1)}) \leq \ln(2) + \max\{\ln(R_{\pi(\hat{n}+1)}^{nm}(1-z)\theta_{\pi(\hat{n}+1)}), \ln(R_{\pi(\hat{n}+1)}^m z \gamma_{\pi(\hat{n}+1)})\},$$

we can again invoke the AM–GM inequality and verify that $$\hat{O}(A) \leq \ln(2) + \max\{g(R_A^{eff},\hat{n}+1), g(R_A^{eff},\hat{n})\} \leq \ln(2) + O'(A)$$

which proves the proposition. Next, we will characterize the impact of adding an additional user on the optimal solution of (2). Suppose that the current optimal solution is either $\hat{O}(A)=h(R_A^{eff},\hat{n}+1)$ or $\hat{O}(A)=g(R_A^{eff},\hat{n}+1)$ for some $\hat{n}$. Then, suppose that a new user $u' \in \backslash A$ is added to the set A to obtain the set $A'=A \cup \{u'\}$. Let $R_{A'}^{eff}$ denote the new vector of effective rates with $\{\tilde{\alpha}_u\}_{u \in A'}$, and $\tilde{\pi}:\{1, \ldots, |A'|\} \to A'$ denoting the scalars and the permutation determined from it, respectively, following (3). We offer the following result whose proof follows upon using Proposition 1 along with some manipulations and is omitted for brevity. The key message from the result stated below is that the integer n which determines the optimal solution either remains unchanged or is incremented by one, upon adding a new user. This result is very useful in enabling complexity reduction in a greedy algorithm introduced later in the sequel.

Proposition 3 Upon adding a new user, the optimal solution can be determined to be $$\hat{O}(') = \begin{cases} h(R_{A'}^{eff}, \hat{n}+1), & \tilde{\alpha}_{\tilde{\pi}(\hat{n}+1)} \in \left[\frac{|A|+1}{\hat{n}+1} - 1, \frac{|A|+1}{\hat{n}} - 1\right], \\ h(R_{A'}^{eff}, \hat{n}+2), & \tilde{\alpha}_{\tilde{\pi}(\hat{n}+2)} \in \left[\frac{|A|+1}{\hat{n}+2} - 1, \frac{|A|+1}{\hat{n}+1} - 1\right], \\ g(R_{A'}^{eff}, \hat{n}+1), & \tilde{\alpha}_{\tilde{\pi}(\hat{n}+1)} < \frac{|A|+1}{\hat{n}+1} - 1 \ \& \ \tilde{\alpha}_{\tilde{\pi}(\hat{n}+2)} > \frac{|A|+1}{\hat{n}+1} - 1 \\ g(R_{A'}^{eff}, \hat{n}+2), & \text{Otherwise} \end{cases}$$

The following corollary completes the simplified setup by covering all the remaining scenarios of interest that can arise when a set of users are associated to any given TP. Corollary 1 Optimal solutions for (2) in the two corner cases, z=0 & z=1, respectively, can be determined as $$(\theta_u, \gamma_u) = \begin{cases} \left(\frac{1}{|A|}, 0\right), & z = 0, \\ \left(0, \frac{1}{|A|}\right), & z = 1, \end{cases} \quad \forall u \in A \quad (7)$$

Thus, in each corner case a solution with an orthogonal split of users is also optimal with respect to (2). Further, for the macro TP and any muting fraction, the solution with an orthogonal split of users given by $$(\theta_u, \gamma_u) = \left(\frac{1}{|A|}, 0\right),$$

$\forall u \in A$ is an optimal solution with respect to (2).

Notice that $\hat{O}: 2 \rightarrow$ can be viewed as a set function where $\hat{O}(\ )$ for all non-empty subsets $\subseteq, \neq \Phi$ is computed using Proposition 1 and where we can define $\hat{O}(\Phi)=0$. Adopting this view, we have the following conjecture.

Conjecture 1 The set function $\hat{O}(.)$ is a submodular set function, i.e., for all $\subseteq \subseteq$ & $u \in \backslash$ it satisfies $$\hat{O}(\cup\{u\}) - \hat{O}(\ ) \geq \hat{O}(\cup\{u\}) - \hat{O}(\ ). \quad (8)$$

We note that the conjecture can be proved in the corner cases when z=0 or z=1 or when the TP is the macro TP, upon invoking the fact that the function $-x\ln(x)$ is non-increasing and concave $\forall x \geq 1$. For all other cases we first note that the condition in (8) is equivalent to the following one $$\hat{O}(\cup\{u\}) - \hat{O}(\ ) \geq \hat{O}(\cup\{u,u'\}) - \hat{O}(\cup\{u'\}), \quad (9)$$

for all $\subseteq$ & $u,u' \in \backslash$. We have been able to verify that (9) holds for several cases but a full proof eludes us.

Approximation Procedure

Let us now return to the original problem (1) and denote its optimal objective value (referred to here as the optimal system utility) by $\hat{O}_P$. Let us expand the optimal system utility as $\hat{O}_P = \max_{z} \hat{O}_P(z)$ where $\hat{O}_P(z)$ denotes the optimal objective value for a given muting fraction $z \in Z$. To obtain an approximately optimal solution for (1) we will use the insights developed in Section 3. Adopting the convention that $0 \ln(0)=0$, we formulate a purely combinatorial problem for any given muting ratio $z \in Z$.

$$\max_{x_{u,b}^m, x_{u,b}^{nm} \in [0,1] \forall u,b} \left\{ \sum_{u \in U} \sum_{b \in B} (x_{u,b}^{nm} \ln(R_{u,b}^{nm}(1-z)) + x_{u,b}^m \ln(R_{u,b}^m z)) - \right.$$

$$\left. \sum_{b \in U} \left( \left(\sum_{k \in U} x_{k,b}^{nm}\right) \ln\left(\sum_{k \in U} x_{k,b}^{nm}\right) + \left(\sum_{k \in U} x_{k,b}^m\right) \ln\left(\sum_{k \in U} x_{k,b}^m\right) \right) \right\} \quad (10)$$

$$\text{s.t.} \sum_{b \in} (x_{u,b}^{nm} + x_{u,b}^m) = 1, \forall u \in U,$$

We offer the following result which proves that for the given $z \in$, the optimal solution of (10) can be efficiently obtained and it approximates $\hat{O}_P(z)$.

Proposition 4 The optimization problem (10) is equivalent to an asymmetric assignment problem and hence is optimally solvable in polynomial time. Further, its optimal objective value is equal to $\hat{O}_P(z)$ when z=0 or z=1 and is no less than $\hat{O}_P(z) - \min\{K, B-1\} \ln(2)$ for all other $z \in (0,1)$.

We first establish the second part of the proposition. Considering any optimal solution to (1) for any given muting fraction z, we expand the optimal objective value as $\hat{O}_P(z) = \Sigma_{b \in} \hat{O}(U^{(b)}, b, z)$ where $U^{(b)}$ denotes the set of users associated with TP b. We note here that $\hat{O}(U^{(b)}, b, z)$ denotes the optimal value obtained upon solving (2) for the associated user set $U^{(b)}$ and TP b, and we have adopted the convention that $\hat{O}(U^{(b)}, b, z)=0$ when $U^{(b)}=\Phi$ (i.e., when $U^{(b)}$ is empty). Notice that there can at-most be $\min\{K, B-1\}$ pico nodes with non-empty associated user sets. Then, for each TP b for which $U^{(b)} \neq \Phi$, we can invoke Proposition 2 to obtain a solution that has an orthogonal split of users and is optimal with respect to (2) in the two corner cases z=0,z=1 or when the TP b is the macro node, and in all other cases yields an objective value no less than $\hat{O}(U^{(b)}, b, z) - \ln(2)$. Collecting such solutions across TPs we obtain a solution that is feasible for (10) and offers an objective value that is equal to $\hat{O}_P(z)$ in the two corner cases and is no less than $\hat{O}_P(z) - \min\{K, B-1\} \ln(2)$.

We next prove the first part of the proposition and show that the problem in (10) can in-fact be optimally solved in polynomial time by reformulating it as an asymmetric assignment problem. To do so, we create K=|U| virtual TPs for each TP b under muting and non-muting, respectively, and define the rewards of associating users to these virtual TPs as $$\omega_{u,b,q}^{nm} = \ln(R_{u,b}^{nm}(1-z)) - q \ln(q) + (q-1)\ln(q-1),$$

$$\omega_{u,b,q}^m = \ln(R_{u,b}^m z) - q \ln(q) + (q-1)\ln(q-1),$$

for all $u \in U, b \in B$ & $q=1, \ldots, K$. Then, consider then the combinatorial problem $$\max_{x_{u,b,q}^{nm}, x_{u,b,q}^m \in [0,1] \forall u,b,q} \sum_{u \in} \sum_{b \in} \sum_{q=1}^{K} (x_{u,b,q}^{nm} \omega_{u,b,q}^{nm} + x_{u,b,q}^m \omega_{u,b,q}^m) \quad (11)$$

$$\text{s.t.} \sum_{u \in} x_{u,b,q}^{nm} \leq 1, \sum_{u \in} x_{u,b,q}^m \leq 1 \forall b \in B, q=1, \ldots, K$$

$$\sum_{b \in} \sum_{q=1}^{K} (x_{u,b,q}^{nm} + x_{u,b,q}^m) = 1 \forall u \in U,$$

Notice that the problem in (11) is an asymmetric assignment problem. More importantly, we will show that it is equivalent to the one in (10).

Consider any TP b and its K corresponding virtual TPs under muting and non-muting, respectively. A key observation is that the sequence $\{-q \ln(q)+(q-1)\ln(q-1)\}_{q=2}^{K}$ is strictly decreasing in q and negative for all q=2, . . . , K. Thus, we deduce that for any user $u \in U$ and TP $b \in B$ we must have $$\omega_{u,b,1}^{nm} \geq \omega_{u,b,2}^{nm} \geq \quad . \quad . \quad . \quad \omega_{u,b,K}^{nm} \& \omega_{u,b,1}^m \geq \omega_{u,b,2}^m \geq \ldots \omega_{u,b,K}^m.$$

Consequently, without loss of optimality we can assume that at any given optimal solution of (11), a user will be associated with virtual TP q of TP b under muting, only if other users have already been associated with virtual TPs 1 to q−1 of TP b under muting. The same observation holds under non-muting as well. As a result, supposing that $U^{(b)} = U^{m(b)} \cup U^{nm(b)}$, where $U^{m(b)} \cap U^{nm(b)} = \Phi$, denotes the user set assigned to the virtual TPs of TP b and its partition into users assigned to virtual TPs under muting and non-muting, respectively, in that optimal solution, we see that the sum reward obtained over these virtual TPs is exactly equal to $\Sigma_{u \in U^{m(b)}} \omega_{u,b,1}^m - |U^{m(b)}| \ln|U^{m(b)}| + \Sigma_{u \in U^{nm(b)}} \omega_{u,b,1}^{nm} - |U^{nm(b)}|$ $|\ln|U^{nm(b)}||$. Hence, the overall sum reward is given by $\Sigma_{b \in B}(\Sigma_{u \in U^{m(b)}} \omega_{u,b,1}{}^m - |U^{m(b)}| \ln|U^{m(b)}| + \Sigma_{u \in U^{nm(b)}} \omega_{u,b,1}{}^{nm} - |U^{nm(b)}| \ln|U^{nm(b)}|)$. However, this is exactly the sum reward obtained by assigning users in $U^{m(b)}$ and $U^{nm(b)}$ to TP b under muting and non-muting, respectively, in (10) (notice that due to the construction of (11), $U = \cup_{b \in B} U^{(b)}$ and $U^{(b)} \cap U^{(b')} = \Phi \forall b \neq b'$). Thus we can conclude that any optimal solution of (11) will yield a feasible solution to (10) having the same sum reward.

Similarly, now consider any optimal solution to (10) and let $\tilde{U}^{(b)} = \tilde{U}^{m(b)} \cup \tilde{U}^{nm(b)}$ & $\tilde{U}^{m(b)} \cap \tilde{U}^{nm(b)} = \Phi$; $\forall b$ be the corresponding user associations. Note again that $U = \cup_{b \in B} \tilde{U}^{(b)}$ and $\tilde{U}^{(b)} \cap \tilde{U}^{(b')} = \Phi \forall b \neq b'$. Then, by simply assigning users in $\tilde{U}^{m(b)}$ ($\tilde{U}^{nm(b)}$) for each b one by one (the exact order is not important) to the first $|\tilde{U}^{m(b)}|$ ($|\tilde{U}|^{nm(b)}|$) virtual TPs of TP b under muting (non-muting), we obtain a feasible assignment to (11) which yields exactly the same sum reward. Thus, any optimal solution of (10) will yield a feasible solution to (11) having the same sum reward. Combining these two deductions, we can deduce that (11) and (10) are equivalent.

An important consequence of Proposition 4 is that (10) can be solved exactly in polynomial time via algorithms such as the Auction algorithm [6]. We now leverage Proposition 4 to construct the Assignment based Algorithm given in Table 1. In that algorithm for each muting fraction, we solve (10) to determine the set of users associated with each TP. In particular, for each muting fraction z, we denote $U_A^{(b)}$ to be the user set associated to TP b which is formed by all users $u \in U$ for which either $\hat{x}_{u,b}{}^m$ or $\hat{x}_{u,b}{}^{nm}$ is one, where $\{\hat{x}_{u,b}{}^m, \hat{x}_{u,b}{}^{nm}\}$ denotes an optimal solution to (10), which in turn can be determined by solving the equivalent problem in (11). The Assignment based Algorithm is an approximation algorithm for the problem in (1), as shown in the following theorem.

Theorem 1 The output of the Assignment based Algorithm yields a system utility that satisfies $\Sigma_{b \in} \hat{O}(_A^{(b)}, b, \hat{z}) \geq \hat{O}_P - \min\{K, B-1\} \ln(2)$.

The theorem follows upon noting that for each one of the finitely many muting fractions in Z, the algorithm first obtains the optimal solution for (10) and then further improves it. In particular, the latter improvement is obtained by considering each TP b and optimizing the allocation fractions for the users associated with it. Consequently, upon invoking Proposition 4 we can deduce that $\Sigma_{b \in B} \hat{O}(U_A^{(b)}, b, z) \geq \hat{O}_P(z) - \min\{K, B-1\} \ln(2)$. Thus, we have that $$\max_{z \in} \left\{ \sum_{b \in} B\hat{O}(u_A^{(B)}, b, z) \right\} \geq \underbrace{\max_{z \in} \{\hat{O}_P(z)\}}_{\hat{O}_P} = \min\{K, B-1\}\ln(2)\}.$$

TABLE 1

Assignment Based Procedure

1. Initialize with $\hat{z} = \phi, \hat{\theta} = -\infty$.
2. For each muting fraction $z \in$ Do
3. Determine user associations $\{U_A^{(b)}\}, b \in B$ by solving (10)
4. For each TP $b \in$ Do
5. Solve (2) using the associated user set $U_A^{(b)}$ and Proposition 1, and let $\hat{O}(U_A^{(b)}, b, z)$ be the resulting objective value
6. End For
7. If $\hat{\theta} < \Sigma_{b \in} \hat{O}(U_A^{(b)}, b, z)$ Then set $\hat{z} = z, \hat{\theta} = \Sigma_{b \in} \hat{O}(U_A^{(b)}, b, z)$
8. End For
9. Output $\hat{z}$, the corresponding user associations and allocation fractions.

We now provide another procedure to sub-optimally solve (1). This procedure (given in Table 2) adopts a greedy approach and has a much lower complexity than the Assignment based Algorithm. Also, a performance guarantee can be established for this algorithm if Conjecture 1 can be proved.

TABLE 2

Greedy Procedure

1. Initialize with $\hat{z} = \phi, \hat{\theta} = -\infty$.
2. For each muting fraction $z \in Z$ Do
3. Set $U_G^{(b)} = \phi$, $\forall b \in B$ and $S = U$.
4. Repeat
5. For each user $u \in S$ Do
6. For each TP $b \in B$ Do
7. Solve (2) using the associated user set $U_G^{(b)} \cup \{u\}$ and Proposition 3, and let $\hat{O}(U_G^{(b)} \cup \{u\}, b, z)$ be the resulting objective value
8. End For
9. End For
10. Determine $\hat{b} = \text{argmax}_{b \in B} \max_{u \in S} \{\hat{O}(U_G^{(b)} \cup \{u\}, b, z) - \hat{O}(U_G^{(b)}, b, z)\}$ followed by $\hat{u} = \text{argmax}_{u \in} \{\hat{O}(_G^{(\hat{b})} \cup \{u\}, \hat{b}, z) - \hat{O}(_G^{(\hat{b})}, \hat{b}, z)\}$
11. Add user $\hat{u}$ to set $U_G^{(\hat{b})}$ and remove it from S
12. Until $S = \phi$
13. If $\hat{\theta} < \Sigma_{b \in B} \hat{O}(U_G^{(b)}, b, z)$ Then set $\hat{z} = z, \hat{\theta} = \Sigma_{b \in B} \hat{O}(U_G^{(b)}, b, z)$
14. End For
15. Output $\hat{z}$, the corresponding user associations and allocation fractions.

Simulation Results

We now present our initial simulation results obtained for an LTE HetNet deployment. We consider a coordination unit formed by one sector which contains a set of B=11 TPs formed by one macro base-station and ten lower power (pico) nodes along with K=32 users. All TPs have one transmit antenna and all users have one receive antenna each. Each macro base-station transmits with a power of 46 dBm whereas the transmit power at each pico node is 35 dBm. A noise power of −104 dBm was assumed. The other major parameters are all as per 3GPP evaluation guidelines. For simplicity we assume that only one muting fraction={0} is allowed and examine the performance of the Assignment based algorithm (which we know from Theorem 1 and Proposition 4 to be optimal in this case) and the greedy algorithm. To benchmark the performance of these two algorithms we determine the utility value for (1) as well as the average and the 5-percentile spectral efficiency (SE) yielded by a baseline scheme in which each user independently associates to the TP from which it can obtain the highest average rate. This association scheme is also referred to as the maximum SINR association [3]. Next, we determine the utility value and the average and 5-percentile SE values yielded by the greedy algorithm, as well as the ones yielded by the assignment based algorithm. These values are provided in Table 3 as relative percentage gains over the respective baseline counterparts. From the results in Table 3, we see that the greedy algorithm is almost optimal and that both the algorithms offer significant 5-percentile SE gains without degrading the average SE.

TABLE 3

Relative percentage gains

| Algorithm | Utility gain | Average SE gain | 5-percentile SE gain |
|---|---|---|---|
| Greedy | 17.51% | 0.9% | 85% |
| Assignment based | 17.57% | 1.3% | 86% |

REFERENCES

[1] 3GPP, "Evolved Universal Terrestrial Radio Access (E-UTRA) and Evolved Universal Terrestrial Radio Access Network (E-UTRAN)," in (Release 10), TS 36.300 V10.8.0, June 2012.

[2] Q. Ye, et. al., "User association for load balancing in heterogeneous cellular networks," in *IEEE Trans. on Wireless Commun.*, March 2013.

[3] J. Andrews, et. al., "An overview of load balancing in HetNets: Old myths and open problems," in *IEEE commun. mag.* (submitted), July 2013

[4] A. Bedekar and R. Agrawal, "Optimal muting and load balancing for eICIC," *Proc. IEEE WiOPT*, May 2013.

[5] Q. Ye, et. al., "On/Off Macrocells and Load Balancing in Heterogeneous Cellular Networks", in *IEEE Globecom.*, December 2013

[6] D. Bertsekas and D. Castanon, "A forward/reverse auction algorithm for asymmetric assignments problems," *Comp. Optimization and Appl.*, 1992.

From the foregoing, it can be appreciated that the present invention achieves considerably higher system utility than existing approaches. Both the average and the 5-percentile spectral efficiencies are significantly improved.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method comprising:
    varying association of users to any one of multiple transmission points in a heterogeneous wireless network for managing interference of transmissions in the network, a muting fraction being one transmission point TP being inactivated or muted for a fraction of a frame duration while other transmission points TPs being active throughout the frame duration;
    determining, at a coarse time-scale, at the start of each frame a choice of which muting fraction to select for a macro TP and which users to associate with each TP so that all users are associated to one TP, by solving an optimization problem;
    averaging inputs to the optimization problem varying metrics that are relevant for a period longer than a backhaul latency, the varying metrics including metrics as single user rates under muting conditions and non-muting conditions with a set of muting fractions;
    applying a coarse scale approach to solving the optimization problem, the coarse scale approach being based on frame level TP coordination of user association and macro partial muting; and
    applying a fine scale approach to solving the optimization problem, the fine scale approach being based on subframe level per-TP user scheduling without coordination.

2. The computer implemented method of claim 1, wherein the fine time scale approach comprises that in each slot each active TP independently does scheduling over a set of users associated with it, without any coordination with any of the other active TPs, based on fast changing information, such as instantaneous rate or SINR estimates, that is received directly by that TP from the users associated to it.

3. The computer implemented method of claim 1, wherein the coarse time scale approach comprises selecting a muting fraction from a feasible set of transmission points and users that have not been picked before and determining system utility that includes user associations and an optimal allocation of a muting fraction for determined user associations.

4. The computer implemented method of claim 3, further comprising if this is the first system utility determined or if it is the largest one yet determined, then designating it as a largest utility and storing a corresponding muting fraction and user association.

5. The computer implemented method of claim 4, further comprising considering if all muting fractions have been considered in determining the system utility and if so outputting the muting fraction and corresponding user association that yields the largest utility of the network.

6. The computer implemented method of claim 2, wherein the fine time scale approach comprises selecting a muting fraction from a feasible set of muting fractions, that has not been picked before, defining a muting fraction set containing all selected user and TP pairs, and setting that muting fraction set to be a null or empty set.

7. The computer implemented method of claim 6, wherein the fine time scale approach comprises selecting and adding to the muting fraction set, the user and TP pair such that the user has not been selected before and that pair that offers the best gain in system utility among all pairs containing such users.

8. The computer implemented method of claim 7, further comprising considering if all users have been assigned a TP and, if so, obtaining a system utility yielded by the muting fraction set of selected user and TP pairs.

9. A non-transitory storage medium configured with instructions for being implemented by a computer for carrying out the method comprising:
    varying association of users to any one of multiple transmission points in a heterogeneous wireless network for managing interference of transmissions in the network, a muting fraction being one transmission point TP being inactivated or muted for a fraction of a frame duration while other transmission points TPs being active throughout the frame duration;
    determining, at a coarse time-scale, at the start of each frame a choice of which muting fraction to select for a macro TP and which users to associate with each TP so that all users are associated to one TP, by solving an optimization problem;
    averaging inputs to the optimization problem varying metrics that are relevant for a period longer than a backhaul latency, the varying metrics including metrics as single user rates under muting conditions and non-muting conditions with a set of muting fractions;
    applying a coarse scale approach to solving the optimization problem, the coarse scale approach being based on frame level TP coordination of user association and macro partial muting; and
    applying a fine scale approach to solving the optimization problem, the fine scale approach being based on subframe level per-TP user scheduling without coordination.

10. The non-transitory storage medium of claim 9, wherein the fine time scale approach comprises that in each slot each active TP independently does scheduling over a set of users associated with it, without any coordination with any of the other active TPs, based on fast changing information, such as instantaneous rate or SINR estimates, that is received directly by that TP from the users associated to it.

11. The non-transitory storage medium of claim 9, wherein the coarse time scale approach comprises selecting a muting fraction from a feasible set of transmission points and users that have not been picked before and determining system utility that includes user associations and an optimal allocation of a muting fraction for determined user associations.

12. The non-transitory storage medium of claim 3, further comprising if this is the first system utility determined or if it is the largest one yet determined, then designating it as a largest utility and storing a corresponding muting fraction and user association.

13. The non-transitory storage medium of claim 2, further comprising considering if all muting fractions have been considered in determining the system utility and if so outputting the muting fraction and corresponding user association that yields the largest utility of the network.

14. The non-transitory storage medium of claim 10, wherein the fine time scale approach comprises selecting a muting fraction from a feasible set of muting fractions, that has not been picked before, defining a muting fraction set containing all selected user and TP pairs, and setting that muting fraction set to be a null or empty set.

15. The non-transitory storage medium of claim 14, wherein the fine time scale approach comprises selecting and adding to the muting fraction set, the user and TP pair such that the user has not been selected before and that pair that offers the best gain in system utility among all pairs containing such users.

16. The non-transitory storage medium of claim 15, further comprising considering if all users have been assigned a TP and, if so, obtaining a system utility yielded by the muting fraction set of selected user and TP pairs.

* * * * *